US012803657B2

(12) United States Patent
Wang et al.

(10) Patent No.: US 12,803,657 B2
(45) Date of Patent: Nov. 17, 2026

(54) EPHEMERIS INFORMATION INDICATION METHOD AND APPARATUS

(71) Applicant: HUAWEI TECHNOLOGIES CO., LTD., Shenzhen (CN)

(72) Inventors: Hui Wang, Shanghai (CN); Shuri Liao, Shanghai (CN); Shengyue Dou, Shanghai (CN); Jiayin Zhang, Shanghai (CN); Xiaolu Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 18/925,557

(22) Filed: Oct. 24, 2024

(65) Prior Publication Data

US 2025/0047367 A1 Feb. 6, 2025

Related U.S. Application Data

(63) Continuation of application No. PCT/CN2023/085678, filed on Mar. 31, 2023.

(30) Foreign Application Priority Data

Apr. 24, 2022 (CN) ......................... 202210436042.4

(51) Int. Cl.
*H04B 7/185* (2006.01)
*H04W 48/08* (2009.01)

(52) U.S. Cl.
CPC ........ *H04B 7/18513* (2013.01); *H04W 48/08* (2013.01)

(58) Field of Classification Search
CPC ............ H04B 7/18513; H04B 7/18526; H04B 7/18545; H04W 48/08; H04W 76/00; G01S 5/00
(Continued)

(56) References Cited

U.S. PATENT DOCUMENTS 8,538,682 B1 * 9/2013 Vankatraman .......... G01S 19/27 701/472
2007/0021122 A1 * 1/2007 Lane ................. H04W 56/0025 455/67.16
(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 17), 3GPP TS 36.331 V17.0.0 (Mar. 2022), total 1119 pages.
(Continued)

*Primary Examiner* — Peguy Jean Pierre
(74) *Attorney, Agent, or Firm* — Rimon PC

(57) ABSTRACT

An ephemeris information indication method and an apparatus are provided. In the method, a terminal device receives ephemeris information in a time window, where the ephemeris information corresponds to a system information modification period in which the time window is located. The terminal device determines, based on the system information modification period and a start position of the system information modification period, the system information modification period in which the time window is located. The terminal device determines the ephemeris information reference time based on an end position of a 1st time window in the system information modification period in which the time window is located.

20 Claims, 10 Drawing Sheets

(58) Field of Classification Search
USPC .......................................................... 455/427
See application file for complete search history.

(56) References Cited

U.S. PATENT DOCUMENTS

| | | | | |
|---|---|---|---|---|
| 2010/0164800 | A1* | 7/2010 | Onda | G01S 19/258 342/357.42 |
| 2014/0062770 | A1* | 3/2014 | Gao | G01S 19/42 342/357.25 |
| 2024/0031960 | A1* | 1/2024 | Wu | H04B 7/18513 |
| 2024/0031965 | A1* | 1/2024 | Wu | H04W 56/0035 |

OTHER PUBLICATIONS

3rd Generation Partnership Project; Technical Specification Group Radio Access Network; NR; Radio Resource Control (RRC) protocol specification (Release 17), 3GPP TS 38.331 V17.0.0 (Mar. 2022), total 1221 pages.

ZTE: "Discussion on the synchronization for IoT-NTN", 3GPP TSG RAN WG1 #107-e, e-Meeting, Nov. 11-19, 2021, R1-2111662, total 9 pages.

ZTE: "Discussion on the synchronization for IoT-NTN", 3GPPTSG RAN WG1 #106bis-e, e-Meeting, Oct. 11-19, 2021, R1-2109847, total 11 pages.

* cited by examiner

| Symbol | $a(km)$ | $e$ | $\omega$(rad) | $\Omega$(rad) | $i$(rad) | M0(rad) |
|---|---|---|---|---|---|---|
| Meaning | Orbital semi-major axis | Eccentricity | Argument of perigee | Right ascension of the ascending node | Orbit inclination angle | Mean anomaly |
| Range | [6500,43000] | [0,0.015] | $[0,2\pi]$ | $[-\pi,\pi]$ | $[0,\pi/2]$ | $[0,2\pi]$ |

FIG. 2

EPHEMERIS INFORMATION INDICATION METHOD AND APPARATUS

CROSS-REFERENCE TO RELATED APPLICATIONS

This application is a continuation of International Application No. PCT/CN2023/085678, filed on Mar. 31, 2023, which claims priority to Chinese Patent Application No. 202210436042.4, filed on Apr. 24, 2022. The disclosures of the aforementioned applications are hereby incorporated by reference in their entireties.

TECHNICAL FIELD

Embodiments of this application relate to the field of wireless communication, and in particular, to an ephemeris information indication method and an apparatus.

BACKGROUND

In satellite communications, because a satellite is far away from the ground, and an air interface delay is large, a terminal device needs to accurately estimate a position of the satellite at each moment to calculate, in advance, a timing advance, to ensure that an uplink and downlink synchronization process of an initial access process is smoothly performed. To accurately estimate the position of the satellite at each moment, the terminal device needs to learn the ephemeris information of the satellite and ephemeris information epoch time. The ephemeris information of the satellite and the ephemeris information reference time are used to determine the position of the satellite at each moment.

In the current discussion of the 3rd generation partnership project (3GPP) standard, the ephemeris information of the satellite may be carried in a system information block (SIB), the SIB carrying the ephemeris information is sent in a system information time window (SI time window), and the ephemeris information reference time may be implicitly indicated by a right boundary of the SI time window in which the SIB carrying the ephemeris information is located, in other words, the terminal device determines the ephemeris information reference time based on the right boundary of the SI time window in which the SIB carrying the ephemeris information is located.

However, for the foregoing method of determining the ephemeris information reference time, when an ephemeris information update period is greater than a periodicity of the SI time window, the ephemeris information reference time determined by the terminal device is inconsistent with the actual ephemeris information reference time. As a result, the terminal device cannot accurately estimate the position of the satellite at each moment, and the terminal incorrectly calculates the timing advance. Consequently, this causes a synchronization failure between the satellite and the terminal device.

SUMMARY

This application provides an ephemeris information indication method and an apparatus, to resolve a problem that the ephemeris information reference time determined by a terminal device is inconsistent with the actual ephemeris information reference time.

According to a first aspect, this application provides an ephemeris information indication method. The method includes: A terminal device receives ephemeris information in a time window, where the ephemeris information is ephemeris information corresponding to a system information modification period in which the time window is located. The terminal device determines, based on the system information modification period and a start position of the system information modification period, the system information modification period in which the time window is located, and determines an ephemeris information reference time based on an end position of a 1$^{st}$ time window in the system information modification period in which the time window is located.

According to the foregoing method, the terminal device may use, as the ephemeris information reference time, the end position of the 1$^{st}$ time window in the system information modification period in which the time window for receiving the ephemeris information is located, to avoid a problem that the ephemeris information reference time determined by the terminal device is inconsistent with the actual ephemeris information reference time.

In a possible design, the system information modification period is the same as an ephemeris information update period, and the start position of the system information modification period is the same as a start position of the ephemeris information update period.

In a possible design, the terminal device receives indication information, where the indication information indicates that the ephemeris information update period is the same as the system information modification period, and the start position of the ephemeris information update period is the same as the start position of the system information modification period.

According to the foregoing method, the terminal device may determine, based on the indication information, that the system information modification period is the same as the ephemeris information update period, and the start position of the system information modification period is the same as the start position of the ephemeris information update period.

In a possible design, the system information modification period is greater than a periodicity of the time window.

In a possible design, a quantity of system frames included in the system information modification period is any one of 64, 128, 256, 512, and 1024.

According to the foregoing design, the quantity of system frames corresponding to the system information modification period is a divisor of 1024 system frames.

In a possible design, the indication information is carried in a system information block 1 SIB 1.

In a possible design, the time window is a system information time window.

According to a second aspect, this application provides an ephemeris information indication method. The method includes: A network device determines ephemeris information; and the network device sends the ephemeris information in a time window, where the ephemeris information is ephemeris information corresponding to a system information modification period in which the time window is located, an ephemeris information update period is the same as the system information modification period, and a start position of the ephemeris information update period is the same as a start position of the system information modification period.

According to the foregoing method, the network device determines that the system information modification period is the same as the ephemeris information update period, and the start position of the system information modification period is the same as the start position of the ephemeris information update period, and sends, in the time window, the ephemeris information corresponding to the system information modification period in which the time window is located.

In a possible design, the network device sends indication information, where the indication information indicates that the ephemeris information update period is the same as the system information modification period, and the start position of the ephemeris information update period is the same as the start position of the system information modification period.

According to the foregoing method, the network device may send the indication information to indicate that the ephemeris information update period is the same as the system information modification period, and the start position of the ephemeris information update period is the same as the start position of the system information modification period.

In a possible design, the system information modification period is greater than a periodicity of the time window.

In a possible design, a quantity of system frames included in the system information modification period is any one of 64, 128, 256, 512, and 1024.

In a possible design, the indication information is carried in a SIB 1.

In a possible design, the time window is a system information time window.

According to a third aspect, this application provides an ephemeris information indication method. The method includes: A network device sends indication information, where the indication information indicates an ephemeris information update period and a start position of the ephemeris information update period, a quantity of time domain scheduling units corresponding to the ephemeris information update period is a divisor of a quantity of time domain scheduling units corresponding to N system frames, and N is a preset value. The network device sends ephemeris information in a time window, where the ephemeris information is ephemeris information corresponding to an ephemeris information update period in which the time window is located.

According to the foregoing method, the network device may send the indication information to indicate the ephemeris information update period and the start position of the ephemeris information update period, and set the quantity of time domain scheduling units corresponding to the ephemeris information update period to the divisor of the quantity of time domain scheduling units corresponding to the N system frames, so that the ephemeris information can be updated in system frames with a same system frame number in every N system frames.

In a possible design, a system frame number corresponding to the start position of the ephemeris information update period is less than N.

In a possible design, a value of N is 1024.

In a possible design, the ephemeris information update period is greater than a periodicity of the time window.

In a possible design, the indication information is carried in a SIB 1.

In a possible design, the time domain scheduling unit is a system frame, a subframe, or a slot.

In a possible design, the time window is a system information time window.

According to a fourth aspect, this application provides an ephemeris information indication method. The method includes: A terminal device receives indication information, where the indication information indicates an ephemeris information update period and a start position of the ephemeris information update period, a quantity of time domain scheduling units corresponding to the ephemeris information update period is a divisor of a quantity of time domain scheduling units corresponding to N system frames, and N is a preset value. The terminal device receives ephemeris information in a time window, where the ephemeris information is ephemeris information corresponding to an ephemeris information update period in which the time window is located. The terminal device determines, based on the ephemeris information update period and the start position of the ephemeris information update period, the ephemeris information update period in which the time window is located, and determines an ephemeris information reference time based on an end position of a 1st time window in the ephemeris information update period in which the time window is located.

According to the foregoing method, the terminal device may determine the ephemeris information update period and the start position of the ephemeris information update period based on the indication information, and may further use, as the ephemeris information reference time, the end position of the 1st time window in the ephemeris information update period in which the time window for receiving the ephemeris information is located, to avoid a problem that the ephemeris information reference time determined by the terminal device is inconsistent with actual ephemeris information reference time.

In a possible design, a system frame number corresponding to the start position of the ephemeris information update period is less than N.

In a possible design, a value of N is 1024.

In a possible design, the ephemeris information update period is greater than a periodicity of the time window.

In a possible design, the indication information is carried in a SIB 1.

In a possible design, the time domain scheduling unit is a system frame, a subframe, or a slot.

In a possible design, the time window is a system information time window.

According to a fifth aspect, this application provides an ephemeris information indication method. The method includes: A network device determines, based on an ephemeris information update period, a window length of a time window for carrying ephemeris information. The network device sends the ephemeris information in the time window for carrying the ephemeris information, where the ephemeris information is ephemeris information corresponding to an ephemeris information update period in which the time window for carrying the ephemeris information is located.

According to the foregoing method, the network device may determine, based on the ephemeris information update period, the window length of the time window for carrying the ephemeris information, to avoid a problem that ephemeris information reference time determined by a terminal device is inconsistent with actual ephemeris information reference time. In addition, the terminal device may determine the ephemeris information reference time based on original logic.

In a possible design, the window length of the time window for carrying the ephemeris information is greater than or equal to the ephemeris information update period.

In a possible design, the time window for carrying the ephemeris information is a system information time window.

In a possible design, a quantity of slots corresponding to the window length of the time window for carrying the ephemeris information is any one of 5, 10, 20, 40, 80, 160, 320, 640, 1280, and 2560.

According to a sixth aspect, this application provides a communication apparatus. The apparatus includes a transceiver module and a processing module. The processing module is configured to determine ephemeris information; the transceiver module is configured to send the ephemeris information in a time window, where the ephemeris information is ephemeris information corresponding to a system information modification period in which the time window is located, an ephemeris information update period is the same as the system information modification period, and a start position of the ephemeris information update period is the same as a start position of the system information modification period.

In a possible design, the transceiver module is configured to send indication information, where the indication information indicates that the ephemeris information update period is the same as the system information modification period, and the start position of the ephemeris information update period is the same as the start position of the system information modification period.

In a possible design, the system information modification period is the same as the ephemeris information update period, and the start position of the system information modification period is the same as the start position of the ephemeris information update period.

In a possible design, the transceiver module is further configured to receive the indication information, where the indication information indicates that the ephemeris information update period is the same as the system information modification period, and the start position of the ephemeris information update period is the same as the start position of the system information modification period.

In a possible design, the system information modification period is greater than a periodicity of the time window.

In a possible design, a quantity of system frames included in the system information modification period is any one of 64, 128, 256, 512, and 1024.

In a possible design, the indication information is carried in a SIB 1.

In a possible design, the time window is a system information time window.

According to a seventh aspect, this application provides a communication apparatus. The apparatus includes a transceiver module and a processing module. The processing module invokes the transceiver module to: send indication information, where the indication information indicates that an ephemeris information update period is the same as a system information modification period, and a start position of the ephemeris information update period is the same as a start position of the system information modification period; and send ephemeris information in a time window, where the ephemeris information is ephemeris information corresponding to a system information modification period in which the time window is located.

In a possible design, the system information modification period is greater than a periodicity of the time window.

In a possible design, a quantity of system frames included in the system information modification period is any one of 64, 128, 256, 512, and 1024.

In a possible design, the indication information is carried in a SIB 1.

In a possible design, the time window is a system information time window.

According to an eighth aspect, this application provides a communication apparatus. The apparatus includes a transceiver module and a processing module. The processing module invokes the transceiver module to: send indication information, where the indication information indicates an ephemeris information update period and a start position of the ephemeris information update period, a quantity of time domain scheduling units corresponding to the ephemeris information update period is a divisor of a quantity of time domain scheduling units corresponding to N system frames, and N is a preset value; and send ephemeris information in a time window, where the ephemeris information is ephemeris information corresponding to an ephemeris information update period in which the time window is located.

In a possible design, a system frame number corresponding to the start position of the ephemeris information update period is less than N.

In a possible design, a value of N is 1024.

In a possible design, the ephemeris information update period is greater than a periodicity of the time window.

In a possible design, the indication information is carried in a SIB 1.

In a possible design, the time domain scheduling unit is a system frame, a subframe, or a slot.

In a possible design, the time window is a system information time window.

According to a ninth aspect, this application provides a communication apparatus. The apparatus includes a transceiver module and a processing module. The transceiver module is configured to receive indication information, where the indication information indicates an ephemeris information update period and a start position of the ephemeris information update period, a quantity of time domain scheduling units corresponding to the ephemeris information update period is a divisor of a quantity of time domain scheduling units corresponding to N system frames, and N is a preset value; and receive ephemeris information in a time window, where the ephemeris information is ephemeris information corresponding to an ephemeris information update period in which the time window is located. The processing module is configured to: determine, based on the ephemeris information update period and the start position of the ephemeris information update period, the ephemeris information update period in which the time window is located; and determine ephemeris information reference time based on an end position of a $1^{st}$ time window in the ephemeris information update period in which the time window is located.

In a possible design, a system frame number corresponding to the start position of the ephemeris information update period is less than N.

In a possible design, a value of N is 1024.

In a possible design, the ephemeris information update period is greater than a periodicity of the time window.

In a possible design, the indication information is carried in a SIB 1.

In a possible design, the time domain scheduling unit is a system frame, a subframe, or a slot.

In a possible design, the time window is a system information time window.

According to a tenth aspect, this application provides a communication apparatus. The apparatus includes a transceiver module and a processing module. The processing module is configured to determine, based on an ephemeris information update period, a window length of a time window for carrying ephemeris information; and the transceiver module is configured to send ephemeris information in the time window for carrying the ephemeris information, where the ephemeris information is ephemeris information corresponding to an ephemeris information update period in which the time window for carrying the ephemeris information is located.

In a possible design, the window length of the time window for carrying the ephemeris information is greater than or equal to the ephemeris information update period.

In a possible design, the time window for carrying the ephemeris information is a system information time window.

In a possible design, a quantity of slots corresponding to the window length of the time window for carrying the ephemeris information is any one of 5, 10, 20, 40, 80, 160, 320, 640, 1280, and 2560.

For technical effects of the first aspect to the fifth aspect, refer to corresponding technical effects of the sixth aspect to the tenth aspect.

According to an eleventh aspect, this application further provides an apparatus. The apparatus may perform the foregoing method design. The apparatus may be a chip or a circuit that can perform the functions corresponding to the foregoing method, or a device including the chip or the circuit.

In a possible implementation, the apparatus includes: a memory, configured to store computer-executable program code; and a processor, where the processor is coupled to the memory. The program code stored in the memory includes instructions. When the processor executes the instructions, the apparatus or a device on which the apparatus is installed is enabled to perform the method in any one of the foregoing possible designs.

The apparatus may further include a communication interface. The communication interface may be a transceiver. Alternatively, if the apparatus is a chip or a circuit, the communication interface may be an input/output interface of the chip, for example, an input/output pin.

In a possible design, the apparatus includes corresponding functional units, respectively configured to implement the steps in the foregoing method. The function may be implemented by hardware, or may be implemented by executing corresponding software by hardware. The hardware or the software includes one or more units corresponding to the foregoing functions.

According to a twelfth aspect, this application provides a computer-readable storage medium. The computer-readable storage medium stores a computer program, and when the computer program runs on an apparatus, the method according to any one of the foregoing possible designs is performed.

According to a thirteenth aspect, this application provides a computer program product. The computer program product includes a computer program, and when the computer program runs on an apparatus, the method according to any one of the foregoing possible designs is performed.

BRIEF DESCRIPTION OF DRAWINGS

FIG. 2 is a diagram of orbit parameter information according to this application;

DESCRIPTION OF EMBODIMENTS

The following describes the technical solutions in embodiments of this application with reference to the accompanying drawings in embodiments of this application. It is clear that the described embodiments are merely some but not all of embodiments of this application. In the specification, claims, and the accompanying drawings of this application, the terms "first", "second", corresponding term numbers, and the like are intended to distinguish between similar objects but do not necessarily indicate a specific order or sequence. It should be understood that the terms used in such a way are interchangeable in proper circumstances. This is merely a manner of discrimination used when objects having a same attribute are described in embodiments of this application. In addition, the terms "include", "have", and any other variants are intended to cover a non-exclusive inclusion, so that a process, method, system, product, or device that includes a series of units is not necessarily limited to those units, but may include other units not expressly listed or inherent to the process, method, system, product, or device.

In descriptions of this application, "/" means "or" unless otherwise specified. For example, A/B may indicate A or B. In this application, "and/or" describes only an association relationship for describing associated objects and indicates that three relationships may exist. For example, A and/or B may indicate the following three cases: Only A exists, both A and B exist, and only B exists. In addition, in the descriptions of this application, "at least one item" means one or more items, and "a plurality of items" means two or more items. "At least one of the following items (pieces)" or a similar expression thereof indicates any combination of these items, including any combination of singular items or plural items. For example, at least one item of a, b, or c may indicate: a, b, c, a and b, a and c, b and c, or a, b, and c, where a, b, and c may be singular or plural.

The technical solutions provided in embodiments of this application may be applied to various communication systems. For example, the technical solutions may be applicable to a long term evolution (LTE) system or a new radio (NR) system, or may be applicable to another future-oriented new system. This is not specifically limited in embodiments of this application. In addition, the terms "system" and "network" may be substituted for each other.

Figure 1:
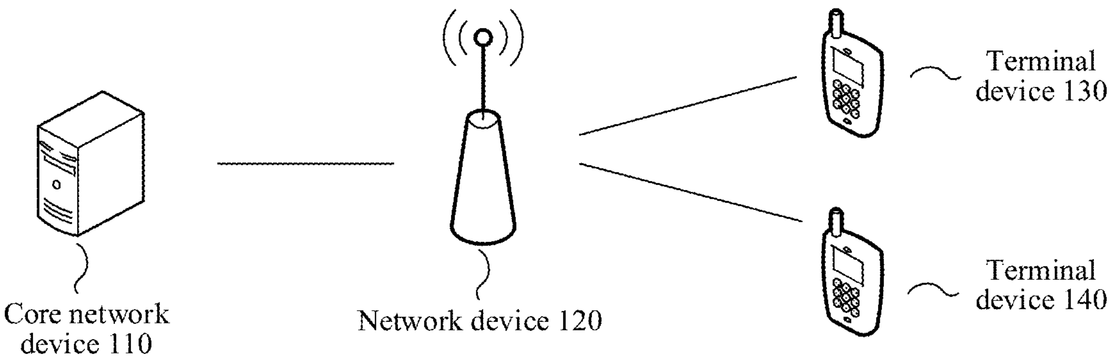
FIG. 1 is a diagram of an architecture of a mobile communication system used in this application.

FIG. 1 is a diagram of an architecture of a mobile communication system used in an embodiment of this application. As shown in FIG. 1, the mobile communication system includes a core network device 110, a network device 120, and at least one terminal device (for example, a terminal device 130 and a terminal device 140 shown in FIG. 1). The terminal device is connected to the network device in a wireless manner, and the network device is connected to the core network device in a wireless manner or a wired manner. The core network device and the network device may be different physical devices independent of each other; functions of the core network device and logical functions of the network device may be integrated into a same physical device; or some functions of the core network device and some functions of the network device may be integrated into one physical device. The terminal device may be located at a fixed position, or may be mobile. FIG. 1 is merely an exemplary diagram. The communication system may further include another network device, for example, may further include a wireless relay device and a wireless backhaul device. This is not shown in FIG. 1. Quantities of core network devices, network devices, and terminal devices included in the mobile communication system are not limited in embodiments of this application.

In this application, the network device may be any device having a wireless transceiver function. The network device includes but is not limited to: an evolved NodeB (NodeB or eNB or e-NodeB) in LTE, a gNodeB (gNB) or a transmission reception point (TRP) in NR, a base station that subsequently evolves in 3GPP, an access node in a Wi-Fi system, a wireless relay node, a wireless backhaul node, or the like. A base station may be a macro base station, a micro base station, a pico base station, a small cell, a relay station, a balloon station, a satellite station, or the like. A plurality of base stations may support networks using a same technology mentioned above, or may support networks using different technologies mentioned above. The base station may include one or more co-site or non-co-site TRPs. Alternatively, the network device may be a radio controller, a central unit (CU), and/or a distributed unit (DU) in a cloud radio access network (CRAN) scenario. Alternatively, the network device may be a server, a wearable device, a vehicle-mounted device, or the like. The following uses an example in which the network device is a base station for description. The plurality of network devices may be base stations of a same type, or may be base stations of different types. The base station may communicate with the terminal device, or may communicate with the terminal device via a relay station. The terminal device may communicate with a plurality of base stations using different technologies. For example, the terminal device may communicate with a base station supporting an LTE network, or may communicate with a base station supporting a 5G network, and may further support dual connections to a base station in the LTE network and a base station in the 5G network.

The terminal device is a device having a wireless transceiver function, and may be deployed on land, including an indoor device, an outdoor device, a handheld device, a wearable device, or a vehicle-mounted device; may be deployed on a water surface (for example, on a ship); or may be deployed in the air (for example, on a plane, a balloon, and a satellite). The terminal device may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in a smart grid, a wireless terminal in transportation safety, a wireless terminal in a smart city, a wireless terminal in a smart home, a wearable terminal device, or the like. An application scenario is not limited in embodiments of this application. The terminal device sometimes may also be referred to as user equipment (UE), an access terminal device, a vehicle-mounted terminal, a terminal in industrial control, a UE unit, a UE station, a mobile station, a remote station, a remote terminal device, a mobile device, a wireless communication device, a UE agent, a UE apparatus, or the like. The terminal device may be located at a fixed position, or may be mobile.

The network device and the terminal device may be deployed on the land, including an indoor device, an outdoor device, a handheld device, or a vehicle-mounted device; may be deployed on the water surface; or may be deployed on a plane, a balloon, and a satellite in the air. Application scenarios of the network device and the terminal device are not limited in embodiments of this application.

Currently, satellite communication has characteristics such as large coverage, a long communication distance, costs independent of a distance, and no restriction of the terrain. In addition, satellite communication networking is fast and flexible, may implement fast network construction, and can be applied to various emergency scenarios. In addition, satellite communication has large delay jitter, a weak anti-interference capability, poor communication quality, and a low communication capacity, and is easy to be affected by a sun outage and an eclipse. In addition, investment costs of professional equipment and personnel for satellite manufacturing, satellite transmission, ground station construction, and network operations and maintenance are high.

In satellite communications, to ensure that an uplink and downlink synchronization process of an initial access process of a terminal device is smoothly performed, the terminal device needs to accurately estimate a position of a satellite at each moment to calculate, in advance, a timing advance. To accurately estimate the position of the satellite at each moment, the terminal device needs to learn the ephemeris information of the satellite and the ephemeris information reference time. In addition, the fast speed of a low-orbit satellite may cause a delay jitter increase and a Doppler frequency offset increase. These problems greatly affect communication quality. To accurately correct a time-frequency offset by the terminal device on the ground, the terminal device also needs to learn of the ephemeris information of the satellite and the ephemeris information reference time.

According to the discussion of the current 3GPP standard, formats of the ephemeris information may include but are not limited to the following two formats.

Format A: The ephemeris information includes a position vector and a velocity vector of the satellite at the ephemeris information reference time.

Format B: The ephemeris information includes orbit parameter information, as shown in FIG. 2.

With reference to the first five parameters in FIG. 2, an elliptical orbit plane on which the satellite is located may be obtained. An accurate position of the satellite on the elliptical orbit plane at the ephemeris information reference time may be determined based on a mean anomaly at the ephemeris information reference time in FIG. 2.

For example, methods of sending the ephemeris information by the satellite may include but are not limited to the following two methods.

Method 1: The ephemeris information of the satellite is calculated by a terrestrial network control center (NCC) and delivered to the terminal device on the ground via the satellite.

Method 2: The ephemeris information of the satellite is calculated on a satellite side and sent to the terminal device on the ground.

For example, a new radio (NR) system is used as an example. In satellite communications, the ephemeris information may be sent to the terminal device by using other system information (OSI).

The OSI refers to one or more SIBs other than a master information block (MIB) and a system information block 1 (SIB 1). The OSI may be carried in a system information (SI) message. Each SI message includes one or more SIBs, other than the SIB 1, that have a same scheduling requirement (for example, a same transmission periodicity). A system message scheduling information (si-SchedulingInfo) field in the SIB 1 may specify SIBs that are included in one SI message. Each SIB may be included only in one SI message. One SI message is associated with one SI time window. In the SI time window, the SI message may be repeatedly sent for a plurality of times, and no other SI message can be sent.

Therefore, in a satellite communication process, the satellite may notify, by using the SIB 1, the terminal device of SI messages, SIBs that are included in each SI message, an SI time window corresponding to each SI message, and a periodicity and a length of each SI time window. When the terminal device needs to obtain a SIB, the terminal device may attempt to perform decoding from a start subframe of an SI time window corresponding to an SI message in which the SIB is located, until the SI message is successfully received. A maximum quantity of subframes on which the terminal device continuously performs decoding is a quantity of subframes corresponding to the SI time window.

Currently, a window length of an SI time window allowed in the 3GPP standard may be a plurality of slots with different values, and a periodicity of the SI time window may be a plurality of milliseconds with different values. Specifically, the window length and the periodicity of the SI time window defined in the 3GPP standard are as follows.

The periodicity of the SI time window (si-Periodicity)={80, 160, 320, 640, 1280, 2560, 5120} ms.

The window length of the SI time window (si-WindowLength)={5, 10, 20, 40, 80, 160, 320, 640, 1280} slots.

It may be understood that an ephemeris information update period is closely related to a hardware capability of the satellite, the periodicity of the SI time window is defined in the standard, and optional values of the SI time window are limited. Therefore, the ephemeris information update period may be less than, equal to, or greater than the periodicity of the SI time window.

Figure 3:
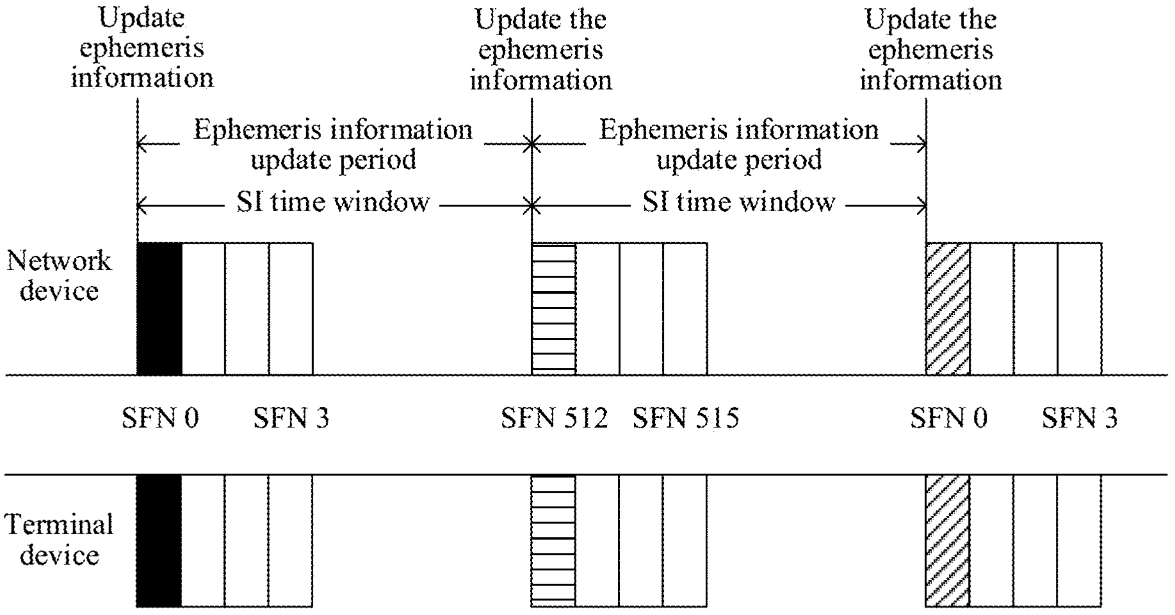
FIG. 3 is a first diagram of an ephemeris information update period and a periodicity of an SI time window according to this application.

As shown in FIG. 3, it is assumed that the ephemeris information update period=5.12 s, the periodicity of the SI time window=5.12 s, and the window length of the SI time window=40 ms. In a scenario in which the ephemeris information reference time is implicitly indicated by a right boundary of an SI time window in which a SIB carrying the ephemeris information is located, after receiving ephemeris information 1 in a system frame number (SFN) 0 (an SFN 0 in the figure) (namely, a system frame 0), the UE determines that ephemeris information reference time corresponding to the ephemeris information 1 is a right boundary (namely, a system frame 3, corresponding to an SFN 3 in the figure) of an SI time window for receiving the ephemeris information 1. The UE receives ephemeris information 2 in a system frame 512, and determines that the ephemeris information reference time corresponding to the ephemeris information 2 is a right boundary (namely, a system frame 515, corresponding to an SFN 515 in the figure) of an SI time window for receiving the ephemeris information 2.

Figure 4:
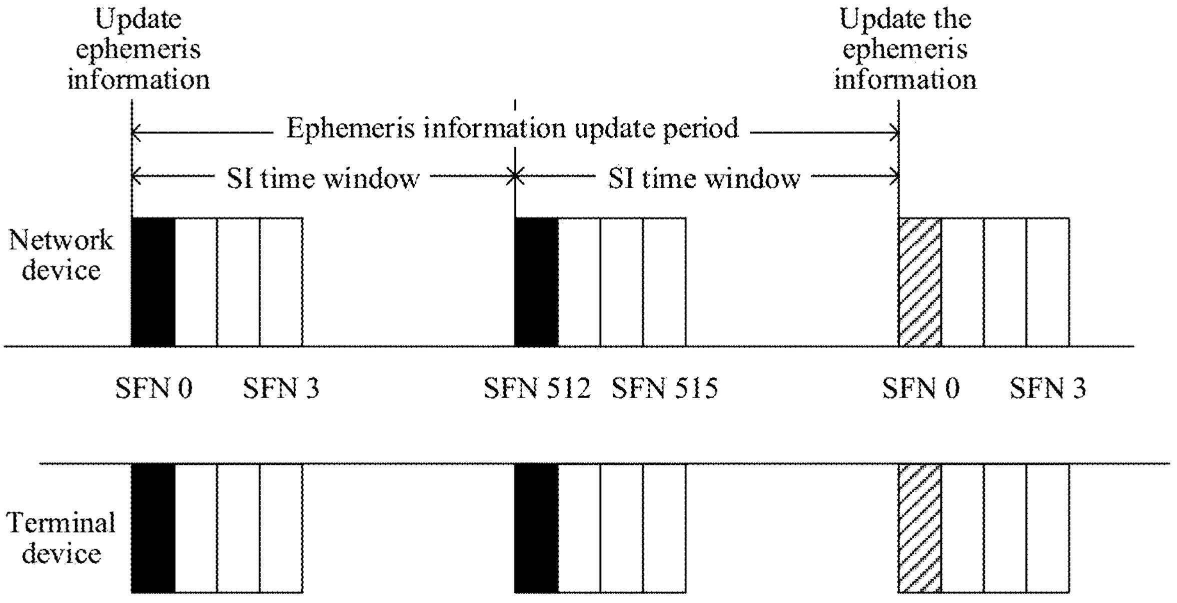
FIG. 4 is a second diagram of an ephemeris information update period and a periodicity of an SI time window according to this application.

As shown in FIG. 4, it is assumed that the ephemeris update period=10.24 s, the periodicity of the SI time window=5.12 s, and the window length of the SI time window=40 ms. After receiving ephemeris information 1 in a system frame 0, the UE determines that the ephemeris information reference time corresponding to the ephemeris information 1 is a right boundary (namely, a system frame 3, corresponding to an SFN 3 in the figure) of an SI time window for receiving the ephemeris information 1. The UE receives ephemeris information 2 in a system frame 512, and determines that the ephemeris information reference time corresponding to the ephemeris information 2 is a right boundary (namely, a system frame 515, corresponding to an SFN 515 in the figure) of an SI time window for receiving the ephemeris information 2. However, because the ephemeris information update period is greater than the periodicity of the SI time window, the ephemeris information 2 received by the UE in the system frame 512 is actually the ephemeris information 1, in other words, a satellite-side ephemeris information has not been updated in the system frame 512. Therefore, the ephemeris information reference time corresponding to the ephemeris information 2 received by the UE in the system frame 512 is not the right boundary (namely, the system frame 515) of the SI time window for receiving the ephemeris information 2, but should be the ephemeris information reference time, namely, the system frame 3, corresponding to the ephemeris information 1. Therefore, the ephemeris information reference time (namely, the system frame 515) determined by the terminal device is inconsistent with the actual ephemeris information reference time (namely, the system frame 3). As a result, the terminal device cannot accurately estimate the orbital position of the satellite, and finally, the terminal device incorrectly calculates the timing advance, causing a synchronization failure between the satellite and the terminal device.

In addition, in the current discussion of the 3GPP standard, a method for determining the ephemeris information reference time is further provided. Specifically, the satellite side may explicitly indicate the ephemeris information reference time by using a system frame number and a subframe number. For example, the ephemeris information further indicates the system frame number and the subframe number that correspond to the ephemeris information reference time (for example, the ephemeris information further indicates that the ephemeris information reference time is a subframe 0 in the system frame 0). After receiving the ephemeris information, the terminal device determines that the subframe 0 in the system frame 0 is the ephemeris information reference time corresponding to the received ephemeris information.

It may be understood that the foregoing method increases overheads of the SIB carrying the ephemeris information. For example, the system frame number ranges from 0 to 1023. Therefore, the system frame needs to be indicated by using 10 bits. The subframe number ranges from 0 to 9. Therefore, the subframe needs to be indicated by using 4 bits. If the system frame number and the subframe number are explicitly indicated in the ephemeris information as the ephemeris information reference time, 14 bits of signaling overhead need to be added in total. This greatly increases the overheads of the SIB carrying the ephemeris information.

It should be noted that, in this application, the system frame number ranges from 0 to 1023, one system frame includes 10 subframes, and the subframe number ranges from 0 to 9. For example, when a subcarrier spacing is 30 kHz, one subframe includes two slots, and the duration of each slot is 0.5 ms. When a subcarrier spacing is 15 kHz, one subframe includes one slot, and the duration of each slot is 1 ms. When a subcarrier spacing is 60 kHz, one subframe includes four slots, and the duration of each slot is 0.25 ms. It may be understood that values of the foregoing parameters are merely examples, and specific values of the foregoing parameters are not limited in this application.

Figure 5:
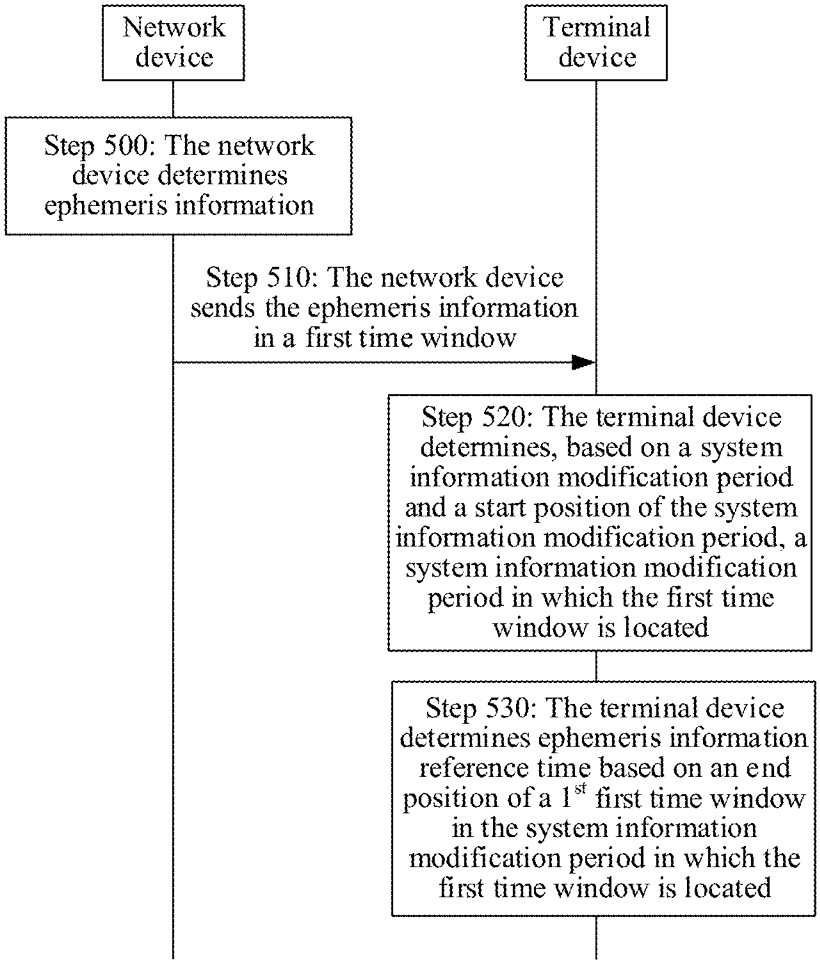
FIG. 5 is a first overview flowchart of an ephemeris information indication method according to this application.

Based on this, an embodiment of this application provides an ephemeris information indication method, to resolve a problem that the ephemeris information reference time determined by a terminal device is inconsistent with the actual ephemeris information reference time. As shown in FIG. 5, the method includes the following steps.

Step 500: A network device determines ephemeris information.

For example, the network device determines ephemeris information corresponding to an ephemeris information update period in which a first time window is located.

It may be understood that when a system information modification period is the same as the ephemeris information update period, and a start position of the system information modification period is the same as a start position of the ephemeris information update period, that the network device determines the ephemeris information corresponding to the ephemeris information update period in which the first time window is located may also be described as that the network device determines ephemeris information corresponding to the system information modification period in which the first time window is located.

Step 510: The network device sends the ephemeris information in the first time window, where the ephemeris information is the ephemeris information corresponding to the system information modification period in which the first time window is located.

The network device sends the ephemeris information in the first time window. For example, the first time window may be an SI time window, or another time window used to carry the ephemeris information. This is not limited in this application. The following uses an example in which the first time window is the SI time window for description. For example, the network device sends the ephemeris information in the SI time window, where the SI time window is a time window used to send a SIB carrying the ephemeris information. For a specific format of the ephemeris information, refer to the foregoing format A and the foregoing format B. For a way to send the ephemeris information, refer to the foregoing method 1 and the foregoing method 2.

For example, the system information modification period may be the same as the ephemeris information update period, and the start position of the system information modification period may be the same as the start position of the ephemeris information update period. Therefore, that the ephemeris information is the ephemeris information corresponding to the system information modification period in which the first time window is located may also be described as that the ephemeris information is the ephemeris information corresponding to the ephemeris information update period in which the first time window is located.

It may be understood that, when the system information modification period is greater than or equal to a periodicity of the first time window, one system information modification period includes at least one first time window. In addition, because the system information modification period is the same as the ephemeris information update period, and the start position of the system information modification period is the same as the start position of the ephemeris information update period, that one system information modification period includes at least one first time window may also be described as that one ephemeris information update period includes at least one first time window. Therefore, the content of the ephemeris information sent by the network device in the at least one first time window is the same. For example, if the system information modification period is twice the periodicity of the first time window, one system information modification period includes two first time windows, in other words, one ephemeris information update period includes two first time windows. The network device separately sends the ephemeris information in the two first time windows, and the content of the ephemeris information sent in the two first time windows is the same.

For example, a start system frame of the system information modification period meets SFN mod m=0, where m is a quantity of system frames included in one system information modification period, and m=modificationPeriodCoeff*defaultPagingCycle. A value of a modification period coefficient (modificationPeriodCoeff) may be 2, 4, 8, or 16. A value of a default paging cycle (defaultPagingCycle) may be 32, 64, 128, or 256. Therefore, a value of the quantity m of system frames included in the system information modification period may be a product of the modification period coefficient and the default paging cycle, that is, any one of 64, 128, 256, 512, 1024, 2048, and 4096. In addition, it may be understood that the value of the quantity m of system frames included in the system information modification period may alternatively be another value. This is not limited in this application. For example, the modification period coefficient and the default paging cycle may be indicated by using a field in a SIB 1, and the start position of the system information modification period may be indicated by using an offset in the SIB 1.

In a possible design, because the system information modification period may include a plurality of values, the network device may use, as the ephemeris information update period, a system information modification period that is greater than or equal to a minimum value of the ephemeris information update period. The minimum value of the ephemeris information update period may be understood as a minimum period required for updating the ephemeris information, and is determined by a hardware capability of a satellite. For example, the network device may use, as the ephemeris information update period, a system information modification period that is greater than or equal to the minimum value of the ephemeris information update period and that has a minimum difference from the minimum value of the ephemeris information update period. For example, if the minimum value of the ephemeris information update period is 5 s, the network device may determine that the ephemeris information update period is 5.12 s. In this case, the value of the quantity m of system frames included in the system information modification period is 512. For another example, if the minimum value of the ephemeris information update period is 6 s, the network device may determine that the ephemeris information update period is 10.24 s. In this case, the value of the quantity m of system frames included in the system information modification period is 1024.

Optionally, the network device may determine the system information modification period based on the minimum value of the ephemeris information update period. The value of the quantity m of system frames included in the system information modification period may be 64, 128, 256, 512, or 1024, in other words, a proper system information modification period is selected from the foregoing five values. The value of m can be exactly divided by 1024, in other words, the value of m is a divisor of 1024, so that ephemeris information in each group of 1024 system frames can be updated in at least one fixed system frame number. For example, if m=512, and the start position of the ephemeris information update period is a system frame 0, the ephemeris information in each group of 1024 system frames is updated in the system frame 0 and a system frame 512.

Optionally, the network device directly uses the system information modification period as the ephemeris information update period, and uses the start position of the system information modification period as the start position of the ephemeris information update period. To be specific, the network device may directly reuse, by using a protocol rule or in a predefined manner, the system information modification period as the ephemeris information update period, and the start position of the system information modification period as the start position of the ephemeris information update period, without notifying the terminal device. Correspondingly, the terminal device determines, according to the protocol rule or in the predefined manner, that the system information modification period is the same as the ephemeris information update period, and the start position of the system information modification period is the same as the start position of the ephemeris information update period.

In another possible design, the network device sends indication information to the terminal device, where the indication information indicates that the ephemeris information update period is the same as the system information modification period, and the start position of the ephemeris information update period is the same as the start position of the system information modification period. In other words, the network device may explicitly indicate, by using the indication information, that the system information modification period is reused as the ephemeris information update period, and the start position of the system information modification period is reused as the start position of the ephemeris information update period. Correspondingly, the terminal device determines, based on the indication information, that the ephemeris information update period is the same as the system information modification period, and the start position of the ephemeris information update period is the same as the start position of the system information modification period.

For example, the indication information may be carried in the SIB 1. For example, the indication information occupies one bit. When a value of the bit is 1, the indication information indicates that the ephemeris information update period is the same as the system information modification period, and the start position of the ephemeris information update period is the same as the start position of the system information modification period. When a value of the bit is 0, the indication information indicates that the ephemeris information update period is different from the system information modification period, and/or the start position of the ephemeris information update period is different from the start position of the system information modification period.

Step 520: The terminal device determines, based on the system information modification period and the start position of the system information modification period, the system information modification period in which the time window is located.

For example, the terminal device may determine, based on the system information modification period and the start position of the system information modification period, a position of the system information modification period in N system frames, or a position of the system information modification period in 10N subframes, or a position of the system information modification period in 20N slots. N is a preset value, for example, N=1024. In addition, N may alternatively be another value, for example, N=2048. A value of N is not limited in this application. The following uses N=1024 as an example for description.

Figure 6:
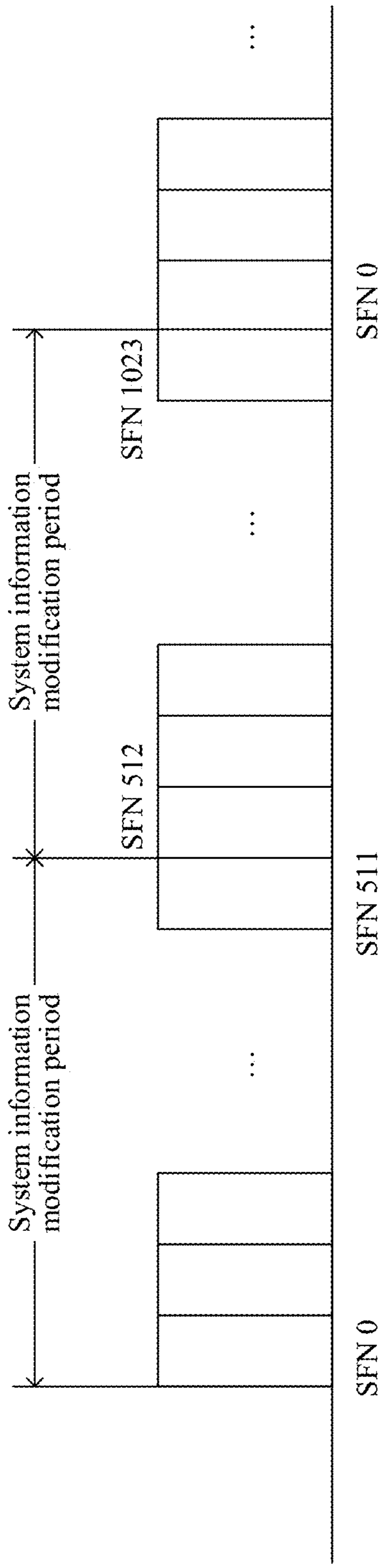
FIG. 6 is a first diagram of a system update period according to this application.

For example, as shown in FIG. 6, if the system information modification period is 5.12 s, and a system frame corresponding to the start position of the system information modification period is the system frame 0 (corresponding to an SFN 0 in the figure), in the N system frames, the system frame 0 (corresponding to the SFN 0 in the figure) to a system frame 511 (corresponding to an SFN 511 in the figure) form one system information modification period, and the system frame 512 (corresponding to an SFN 512 in the figure) to a system frame 1023 (corresponding to an SFN 1023 in the figure) form one system information modification period.

Figure 7:
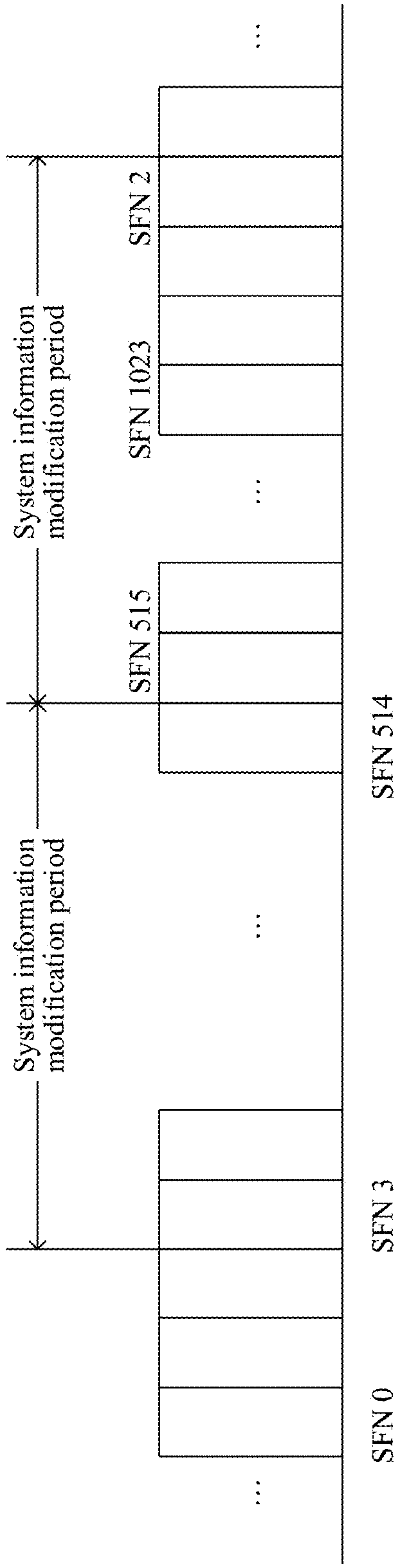
FIG. 7 is a second diagram of a system update period according to this application.

For another example, as shown in FIG. 7, if the system information modification period is 5.12 s, and a system frame corresponding to the start position of the system information modification period is a system frame 3 (corresponding to an SFN 3 in the figure), in the N system frames, the system frame 3 (corresponding to the SFN 3 in the figure) to a system frame 514 (corresponding to an SFN 514 in the figure) form one system information modification period, and a system frame 515 (corresponding to an SFN 515 in the figure) to a system frame 2 (corresponding to an SFN 2 in the figure) form one system information modification period. The system frame 2 is a system frame 2 in a next group of 1024 system frames.

Further, the terminal device may determine, based on the position of the system information modification period in the N system frames and a position of the time window, the system information modification period in which the time window is located.

Figure 8:
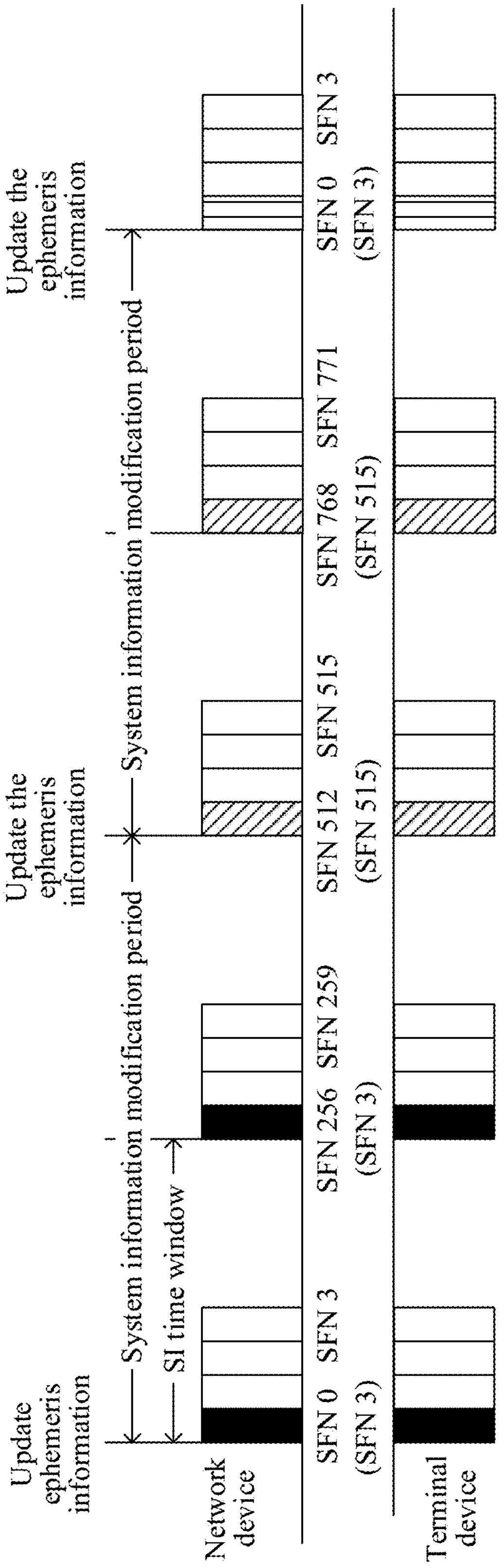
FIG. 8 is a first diagram of a system information modification period and a periodicity of an SI time window according to this application.

As shown in FIG. 8, the system information modification period=5.12 s, the system frame corresponding to the start position of the system information modification period is the system frame 0, a periodicity of the SI time window is 2.56 s, a window length of the SI time window=40 ms, and a system frame corresponding to a start position of the periodicity of the SI time window is the system frame 0 (corresponding to the SFN 0 in the figure). The network device sends ephemeris information in the system frame 0, and the terminal device receives the ephemeris information in the system frame 0. The system frame 0 to the system frame 3 (corresponding to the SFN 3 in the figure) form one SI time window. In this case, a time window for receiving the ephemeris information is located in the system information modification period including the system frame 0 to the system frame 511 (corresponding to the SFN 511 in the figure).

Similarly, if the terminal device receives the ephemeris information in a system frame 256 (corresponding to an SFN 256 in the figure), the time window for receiving the ephemeris information is also located in the system information modification period including the system frame 0 to the system frame 511. If the terminal device receives the ephemeris information in the system frame 512 (corresponding to the SFN 512 in the figure), the time window for receiving the ephemeris information is also located in the system information modification period including the system frame 512 to the system frame 1023 (corresponding to the SFN 1023 in the figure). If the terminal device receives the ephemeris information in a system frame 768 (corresponding to an SFN 768 in the figure), the time window for receiving the ephemeris information is also located in the system information modification period including the system frame 512 to the system frame 1023.

Figure 9:
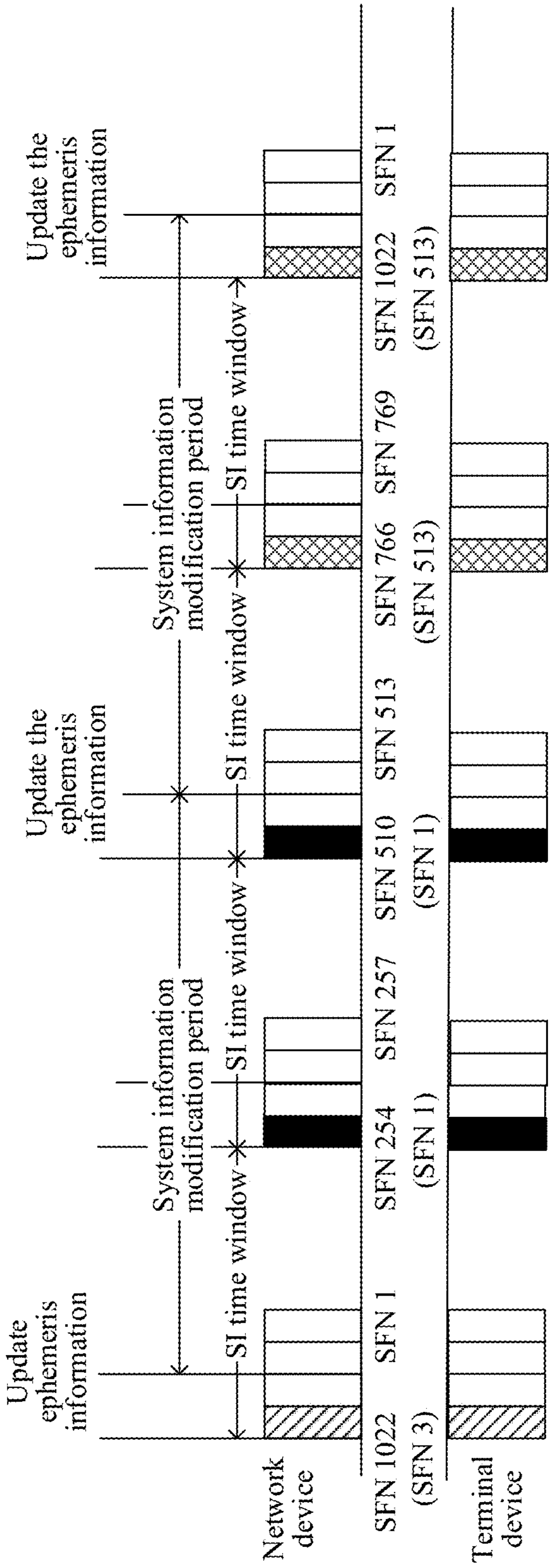
FIG. 9 is a second diagram of a system information modification period and a periodicity of an SI time window according to this application.

As shown in FIG. 9, the system information modification period=5.12 s, the system frame corresponding to the start position of the system information modification period is the system frame 0, a periodicity of the SI time window is 2.56 s, a window length of the SI time window=40 ms, and a system frame corresponding to a start position of the periodicity of the SI time window is a system frame 1022 (corresponding to an SFN 1022 in the figure). The network device sends ephemeris information in the system frame 1022, and the terminal device receives the ephemeris information in the system frame 1022. A time window in which the system frame 1022 is located crosses two system information modification periods. Based on a start position of the time window in which the system frame 1022 is located, the time window is determined to be located in the system information modification period including the system frame 512 to the system frame 1023.

Similarly, if the terminal device receives the ephemeris information in a system frame 254 (corresponding to an SFN 254 in the figure), the time window for receiving the ephemeris information is located in the system information modification period including the system frame 0 (corresponding to the SFN 0 in the figure) to the system frame 511 (corresponding to the SFN 511 in the figure). The terminal device receives the ephemeris information in a system frame 510 (corresponding to an SFN 510 in the figure), and the ephemeris information sent by the network device in the system frame 510 is ephemeris information corresponding to the system information modification period including the system frame 0 to the system frame 511. Although a time window in which the system frame 510 is located crosses two system information modification periods, the terminal device determines, based on a start position of the time window in which the system frame 510 is located, that the time window is also located in the system information modification period including the system frame 0 to the system frame 511. If the terminal device receives the ephemeris information in a system frame 766 (corresponding to an SFN 766 in the figure), the time window for receiving the ephemeris information is also located in the system information modification period including the system frame 512 (corresponding to the SFN 512 in the figure) to the system frame 1023 (corresponding to the SFN 1023 in the figure).

Step 530: The terminal device determines an ephemeris information reference time based on an end position of a $1^{st}$ time window in the system information modification period in which the time window is located.

For example, in step 520, if the terminal device has learned of the system information modification period in which the time window is located, the terminal device further uses the end position of the $1^{st}$ time window in the system information modification period as the ephemeris information reference time.

As shown in FIG. 8, the system information modification period=5.12 s, the system frame corresponding to the start position of the system information modification period is the system frame 0 (corresponding to the SFN 0 in the figure), the periodicity of the SI time window is 2.56 s, the window length of the SI time window=40 ms, and the system frame corresponding to the start position of the periodicity of the SI time window is the system frame 0. The terminal device receives the ephemeris information in the system frame 0, the time window for receiving the ephemeris information is located in the system information modification period including the system frame 0 to the system frame 511 (corresponding to the SFN 511 in the figure), and a system frame corresponding to an end position of a $1^{st}$ SI time window in the system information modification period including the system frame 0 to the system frame 511 is the system frame 3 (corresponding to the SFN 3 in the figure). In this case, the ephemeris information reference time corresponding to the ephemeris information received in the system frame 0 is the system frame 3.

Similarly, if the terminal device receives the ephemeris information in the system frame 256 (corresponding to the SFN 256 in the figure), the time window for receiving the ephemeris information is also located in the system information modification period including the system frame 0 to the system frame 511, and ephemeris information reference time corresponding to the ephemeris information received in the system frame 256 is also the system frame 3. The terminal device receives the ephemeris information in the system frame 512, the time window for receiving the ephemeris information is also located in the system information modification period including the system frame 512 (corresponding to the SFN 512 in the figure) to the system frame 1023 (corresponding to the SFN 1023 in the figure), and a system frame corresponding to an end position of a $1^{st}$ SI time window in the system information modification period including the system frame 512 to the system frame 1023 is the system frame 515 (corresponding to the SFN 515 in the figure). In this case, the ephemeris information reference time corresponding to the ephemeris information received in the system frame 512 is the system frame 515. If the terminal device receives the ephemeris information in the system frame 768 (corresponding to the SFN 768 in the figure), and the time window for receiving the ephemeris information is also located in the system information modification period including the system frame 512 to the system frame 1023, the ephemeris information reference time corresponding to the ephemeris information received in the system frame 768 is also the system frame 515.

As shown in FIG. 9, the system information modification period=5.12 s, the system frame corresponding to the start position of the system information modification period is the system frame 0, the periodicity of the SI time window is 2.56 s, the window length of the SI time window=40 ms, and the system frame corresponding to the start position of the periodicity of the SI time window is the system frame 1022 (corresponding to the SFN 1022 in the figure). The terminal device receives the ephemeris information in the system frame 1022, the time window in which the system frame 1022 is located is located in the system information modification period including the system frame 512 to the system frame 1023, and a system frame corresponding to an end position of a $1^{st}$ SI time window in the system information modification period including the system frame 512 to the system frame 1023 is a system frame 513. In this case, the ephemeris information reference time corresponding to the ephemeris information received in the system frame 1022 is the system frame 513.

Similarly, the terminal device receives the ephemeris information in the system frame 254 (corresponding to the SFN 254 in the figure), and the time window for receiving the ephemeris information is located in the system information modification period including the system frame 0 (corresponding to the SFN 0 in the figure) to the system frame 511 (corresponding to the SFN 511 in the figure). If a system frame corresponding to an end position of a 1st SI time window in the system information modification period including the system frame 0 to the system frame 511 is a system frame 1 (corresponding to an SFN 1 in the figure), the ephemeris information reference time corresponding to the ephemeris information received in the system frame 254 is the system frame 1. The terminal device receives the ephemeris information in the system frame 510 (corresponding to the SFN 510 in the figure). If a time window in which the system frame 510 is located is also located in the system information modification period including the system frame 0 to the system frame 511, the ephemeris information reference time corresponding to the ephemeris information received in the system frame 510 is the system frame 1. The terminal device receives the ephemeris information in the system frame 766 (corresponding to the SFN 766 in the figure), and the time window for receiving the ephemeris information is located in the system information modification period including the system frame 512 (corresponding to the SFN 512 in the figure) to the system frame 1023 (corresponding to the SFN 1023 in the figure). In this case, the ephemeris information reference time corresponding to the ephemeris information received in the system frame 766 is the system frame 513 (corresponding to the SFN 513 in the figure).

According to the foregoing embodiment, the terminal device may use, as the ephemeris information reference time, the end position of the 1st time window in the system information modification period in which the time window for receiving the ephemeris information is located, to avoid a problem that the ephemeris information reference time determined by the terminal device is inconsistent with the actual ephemeris information reference time.

Figure 10:
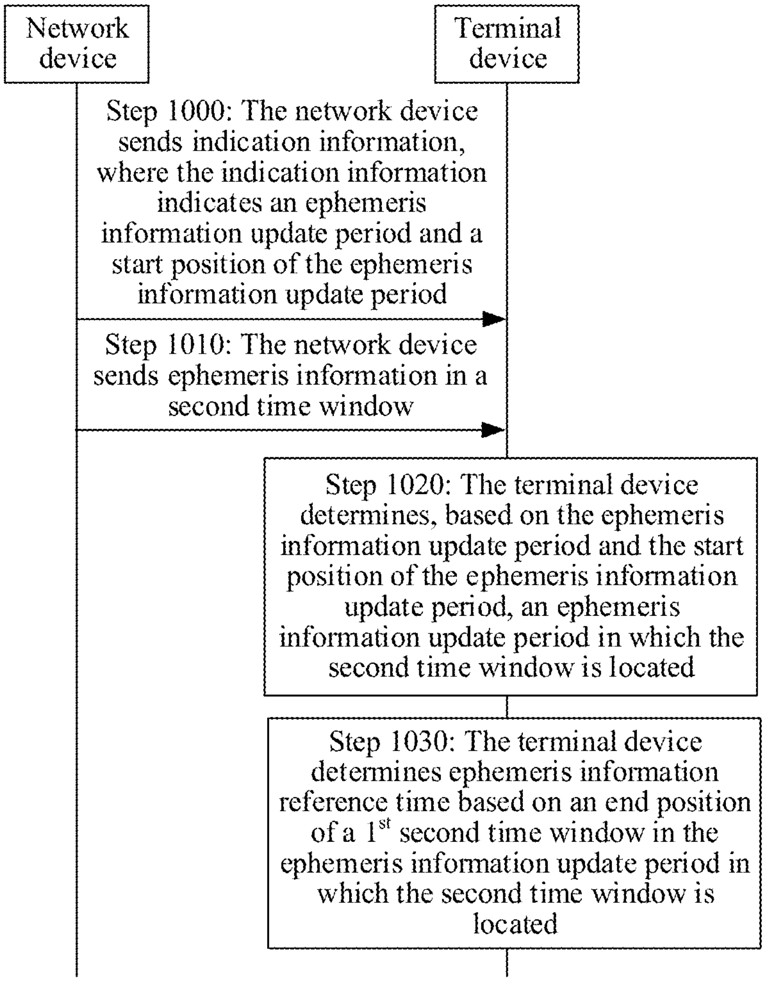
FIG. 10 is a second overview flowchart of an ephemeris information indication method according to this application.

An embodiment of this application further provides an ephemeris information indication method, to resolve a problem that ephemeris information reference time determined by a terminal device is inconsistent with the actual ephemeris information reference time. As shown in FIG. 10, the method includes the following steps.

Step 1000: A network device sends indication information, where the indication information indicates an ephemeris information update period and a start position of the ephemeris information update period, a quantity of time domain scheduling units corresponding to the ephemeris information update period is a divisor of a quantity of time domain scheduling units corresponding to N system frames, and N is a preset value. Correspondingly, the terminal device receives the indication information.

For example, the indication information may be carried in a SIB 1.

It may be understood that, that the quantity of time domain scheduling units corresponding to the ephemeris information update period is the divisor of the quantity of time domain scheduling units corresponding to the N system frames may also be described as that a remainder obtained by dividing the quantity of time domain scheduling units corresponding to the N system frames by the quantity of time domain scheduling units corresponding to the ephemeris information update period is zero, or the quantity of time domain scheduling units corresponding to the N system frames can be exactly divided by the quantity of time domain scheduling units corresponding to the ephemeris information update period.

For example, the time domain scheduling unit may be a system frame, a subframe, or a slot. For example, when the time domain scheduling unit is the system frame, a quantity of system frames corresponding to the ephemeris information update period is a divisor of a quantity N of system frames corresponding to the N system frames. When the time domain scheduling unit is the subframe, a quantity of subframes corresponding to the ephemeris information update period is a divisor of a quantity (namely, 10N) of subframes corresponding to the N system frames. When the time domain scheduling unit is the slot and a subcarrier spacing is 30 kHz, a quantity of slots corresponding to the ephemeris information update period is a divisor of a quantity (namely, 20N) of slots corresponding to the N system frames. A value of N may be 1024 or another value, for example, 2048. The value of N is not limited in this application.

According to the foregoing design, the quantity of time domain scheduling units corresponding to the ephemeris information update period is the divisor of the quantity of time domain scheduling units corresponding to the N system frames, so that ephemeris information in each group of 1024 system frames can be updated in at least one fixed time domain scheduling unit. For example, if the ephemeris information update period is 5.12 ms, and the start position of the ephemeris information update period is a system frame 0, the ephemeris information in each group of 1024 system frames is updated in the system frame 0 and a system frame 512.

For example, a system frame number corresponding to the start position of the ephemeris information update period is less than N. For example, when N=1024, the system frame number corresponding to the start position of the ephemeris information update period may be 0 to 1023. When the system frame number corresponding to the start position of the ephemeris information update period is greater than or equal to 1024, the system frame number may be converted to 0 to 1023. For example, the system frame number corresponding to the start position of the ephemeris information update period is K, where $K \geq 1024$, and K is an integer. This is equivalent to that the system frame number corresponding to the start position of the ephemeris information update period is $K-1024$.

Step 1010: The network device sends ephemeris information in a second time window, where the ephemeris information is ephemeris information corresponding to an ephemeris information update period in which the second time window is located.

For example, the second time window may be an SI time window, or another time window used to carry the ephemeris information. This is not limited in this application.

For example, in a scenario in which the ephemeris information update period is greater than a periodicity of the second time window, one ephemeris information update period includes at least one second time window. Therefore, content of the ephemeris information sent by the network device in the at least one second time window is the same. For example, if the ephemeris information update period is twice the periodicity of the second time window, one ephemeris information update period includes two second time windows. The network device separately sends the ephemeris information in the two second time windows, and content of the ephemeris information sent in the two second time windows is the same.

Step 1020: The terminal device receives the ephemeris information in the second time window, and determines, based on the ephemeris information update period and the start position of the ephemeris information update period, the ephemeris information update period in which the second time window is located.

Step 1030: The terminal device determines an ephemeris information reference time based on an end position of a $1^{st}$ second time window in the ephemeris information update period in which the second time window is located.

It may be understood that, in the embodiment shown in FIG. 5, the ephemeris information update period is the same as a system information modification period, and the start position of the ephemeris information update period is the same as a start position of the system information modification period. Therefore, for step 1020, refer to step 520, and for step 1030, refer to step 530. Details are not described herein again.

According to the foregoing embodiment, the terminal device may use, as the ephemeris information reference time, the end position of the $1^{st}$ time window in the ephemeris information update period in which the time window for receiving the ephemeris information is located, to avoid a problem that the ephemeris information reference time determined by the terminal device is inconsistent with the actual ephemeris information reference time.

Figure 11:
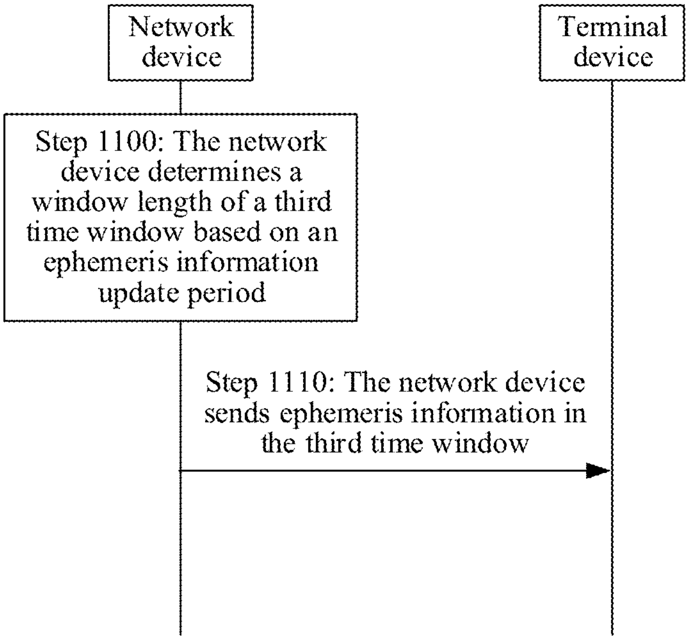
FIG. 11 is a third overview flowchart of an ephemeris information indication method according to this application.

An embodiment of this application further provides an ephemeris information indication method. As shown in FIG. 11, the method includes the following steps.

Step 1100: A network device determines a window length of a third time window based on an ephemeris information update period, where the third time window is a time window for carrying ephemeris information.

For example, the window length of the third time window may be greater than or equal to the ephemeris information update period.

It may be understood that, when the window length of the third time window is greater than or equal to the ephemeris information update period, a periodicity of the third time window is greater than or equal to the ephemeris information update period. Therefore, a case in which the periodicity of the third time window is less than the ephemeris information update period does not exist, and a problem that ephemeris information reference time determined by a terminal device is inconsistent with the actual ephemeris information reference time does not occur.

In a possible implementation, the third time window may be a system information time window, for example, an SI time window.

For example, if the ephemeris information update period is 30 ms, and it can be learned from the foregoing content that, in the conventional technology, a window length of the SI time window={5, 10, 20, 40, 80, 160, 320, 640, 1280} slots, the network device determines, based on the ephemeris information update period, that the window length of the third time window is 40 ms.

For another example, to be applicable to a scenario in which the ephemeris information update period is long, at least one optional value may be added to a window length of the SI time window. For example, an updated window length of the SI time window={5, 10, 20, 40, 80, 160, 320, 640, 1280, 2560} slots.

In a possible implementation, the third time window may be a newly added time window, for example, a newly defined time window for carrying the ephemeris information. For example, a window length of the newly defined time window={5, 10, 20, 40, 80, 160, 320, 640, 1280, 2560} slots.

Step 1110: The network device sends the ephemeris information in the third time window, where the ephemeris information is ephemeris information corresponding to an ephemeris information update period in which the third time window is located.

According to the foregoing embodiment, the window length of the time window (for example, the third time window) for carrying the ephemeris information is determined based on the ephemeris information update period, to avoid a problem that the ephemeris information reference time determined by the terminal device is inconsistent with the actual ephemeris information reference time, and the terminal device may determine the ephemeris reference time based on original logic.

Figure 12:
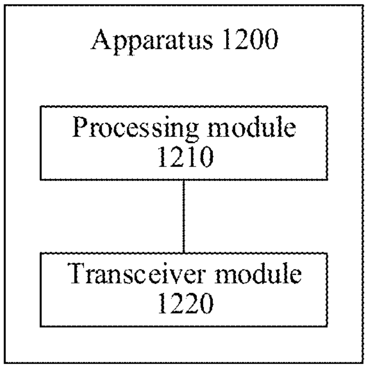
FIG. 12 is a first diagram of a structure of a communication apparatus according to this application.

FIG. 12 is a possible example block diagram of a communication apparatus according to an embodiment of this application. The apparatus 1200 includes a transceiver module 1220 and a processing module 1210. The transceiver module 1220 may include a receiving unit and a sending unit. The processing module 1210 is configured to control and manage an action of the apparatus 1200. The transceiver module 1220 is configured to support the apparatus 1200 in communicating with another network entity. Optionally, the apparatus 1200 may further include a storage unit. The storage unit is configured to store program code and data of the apparatus 1200.

Optionally, each module in the apparatus 1200 may be implemented by using software.

Optionally, the processing module 1210 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various example logical blocks, modules, and circuits described with reference to content disclosed in embodiments of this application. The processor may alternatively be a combination of processors implementing a computing function, for example, a combination of one or more microprocessors, or a combination of the DSP and a microprocessor. The transceiver module 1220 may be a communication interface, a transceiver, a transceiver circuit, or the like. The communication interface is a general term. During specific implementation, the communication interface may include a plurality of interfaces. The storage unit may be a memory.

When the apparatus 1200 is a terminal device or a chip in the terminal device, the processing module 1210 in the apparatus 1200 may support the apparatus 1200 in performing the action of the terminal device in the foregoing method examples. For example, the apparatus 1200 may be supported in performing step 520 or step 530 in FIG. 5.

The transceiver module 1220 may support the apparatus 1200 in communicating with a network device. For example, the transceiver module 1220 may support the apparatus 1200 in performing step 510 in FIG. 5.

For example, the transceiver module 1220 is configured to receive ephemeris information in a time window, where the ephemeris information is ephemeris information corresponding to a system information modification period in which the time window is located.

The processing module 1210 is configured to: determine, based on the system information modification period and a start position of the system information modification period, the system information modification period in which the time window is located; and determine ephemeris information reference time based on an end position of a 1st time window in the system information modification period in which the time window is located.

In a possible design, the system information modification period is the same as an ephemeris information update period, and the start position of the system information modification period is the same as a start position of the ephemeris information update period.

In a possible design, the transceiver module 1220 is further configured to receive indication information, where the indication information indicates that the ephemeris information update period is the same as the system information modification period, and the start position of the ephemeris information update period is the same as the start position of the system information modification period.

In a possible design, the system information modification period is greater than a periodicity of the time window.

In a possible design, a quantity of system frames included in the system information modification period is any one of 64, 128, 256, 512, and 1024.

In a possible design, the indication information is carried in a SIB 1.

In a possible design, the time window is a system information time window.

It should be understood that the apparatus 1200 according to this embodiment of this application may correspond to the terminal device in the foregoing method embodiments, and operations and/or functions of the modules in the apparatus 1200 are separately used to implement corresponding steps of the method of the terminal device in the foregoing method embodiments. Therefore, beneficial effects in the foregoing method embodiments can also be implemented. For brevity, details are not described herein again.

When the apparatus 1200 is a network device or a chip in the network device, the processing module 1210 in the apparatus 1200 may support the apparatus 1200 in performing the action of the network device in the foregoing method examples. For example, the processing module 1210 may support the apparatus 1200 in performing step 500 in FIG. 5.

The transceiver module 1220 may support the apparatus 1200 in communicating with a terminal device. For example, the transceiver module 1220 may support the apparatus 1200 in performing step 510 in FIG. 5.

For example, the processing module 1210 is configured to determine ephemeris information.

The transceiver module 1220 is configured to send the ephemeris information in a time window, where the ephemeris information is ephemeris information corresponding to a system information modification period in which the time window is located, an ephemeris information update period is the same as the system information modification period, and a start position of the ephemeris information update period is the same as a start position of the system information modification period.

In a possible design, the transceiver module 1220 is configured to send indication information, where the indication information indicates that the ephemeris information update period is the same as the system information modification period, and the start position of the ephemeris information update period is the same as the start position of the system information modification period.

In a possible design, the system information modification period is greater than a periodicity of the time window.

In a possible design, a quantity of system frames included in the system information modification period is any one of 64, 128, 256, 512, and 1024.

In a possible design, the indication information is carried in a SIB 1.

In a possible design, the time window is a system information time window.

It should be understood that the apparatus 1200 according to this embodiment of this application may correspond to the network device in the foregoing method embodiments, and operations and/or functions of the modules in the apparatus 1200 are separately used to implement corresponding steps of the method of the network device in the foregoing method embodiments. Therefore, beneficial effects in the foregoing method embodiments can also be implemented. For brevity, details are not described herein again.

Figure 13:
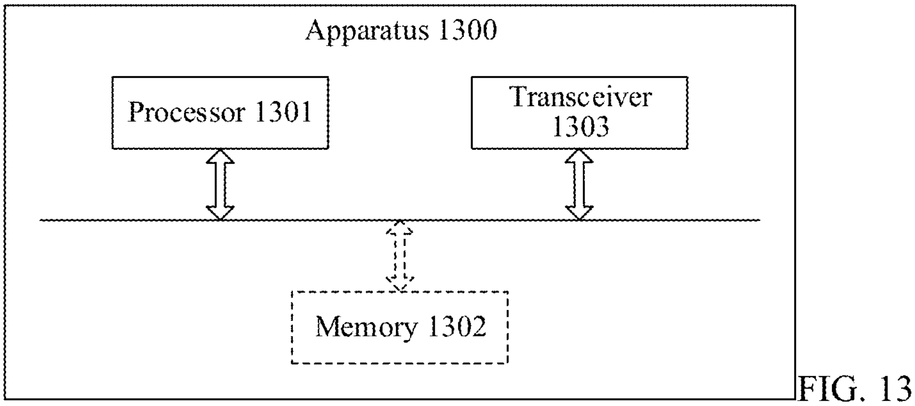
FIG. 13 is a second diagram of a structure of a communication apparatus according to this application.

FIG. 13 is a diagram of a structure of a communication apparatus 1300 according to an embodiment of this application. As shown in FIG. 13, the apparatus 1300 includes a processor 1301.

When the apparatus 1300 is a network device or a chip in the network device, in a possible implementation, the processor 1301 is configured to invoke an interface to perform the following actions: sending indication information, where the indication information indicates that an ephemeris information update period is the same as a system information modification period, and a start position of the ephemeris information update period is the same as a start position of the system information modification period; and sending ephemeris information in a time window, where the ephemeris information is ephemeris information corresponding to a system information modification period in which the time window is located.

It should be understood that the apparatus 1300 may be further configured to perform other steps and/or operations on a network device side in the foregoing embodiments. For brevity, details are not described herein.

When the apparatus 1300 is a terminal device or a chip in the terminal device, in a possible implementation, the processor 1301 is configured to invoke an interface to perform the following actions: receiving ephemeris information in a time window, where the ephemeris information is ephemeris information corresponding to a system information modification period in which the time window is located; determining, based on the system information modification period and a start position of the system information modification period, the system information modification period in which the time window is located; and determining the ephemeris information reference time based on an end position of a 1st time window in the system information modification period in which the time window is located.

It should be understood that the apparatus 1300 may be further configured to perform other steps and/or operations on a terminal device side in the foregoing embodiments. For brevity, details are not described herein.

It should be understood that the processor 1301 may invoke the interface to perform the foregoing sending/receiving action, and the invoked interface may be a logical interface or a physical interface. This is not limited. Optionally, the physical interface may be implemented by using a transceiver. Optionally, the apparatus 1300 further includes a transceiver 1303.

Optionally, the apparatus 1300 further includes a memory 1302, and the memory 1302 may store program code in the foregoing method embodiment for invoking by the processor 1301.

Specifically, if the apparatus 1300 includes the processor 1301, the memory 1302, and the transceiver 1303, the processor 1301, the memory 1302, and the transceiver 1303 communicate with each other through an internal connection channel to transfer a control signal and/or a data signal. In a possible design, the processor 1301, the memory 1302, and the transceiver 1303 may be implemented by using a chip. The processor 1301, the memory 1302, and the transceiver 1303 may be implemented in a same chip, may be separately implemented in different chips, or any two functions are implemented in one chip. The memory 1302 may store the program code. The processor 1301 invokes the program code stored in the memory 1302 to implement a corresponding function of the apparatus 1300.

The method disclosed in the foregoing embodiments of this application may be applied to the processor, or may be implemented by the processor. The processor may be an integrated circuit chip that has a signal processing capability. In an implementation process, steps in the foregoing method embodiments may be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware assembly, or may be a system on chip (SoC), or may be a central processing unit (CPU), or may be a network processor (NP), or may be a digital signal processing circuit (DSP), or may be a micro controller unit (MCU), or may be a programmable logic device (PLD) or another integrated chip. The processor may implement or perform the methods, the steps, and logical block diagrams that are disclosed in embodiments of this application. The general-purpose processor may be a microprocessor, or the processor may be any conventional processor or the like. The steps in the method disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in this embodiment of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and method described in this specification includes but is not limited to these memories and any memory of another proper type.

It should be understood that in embodiments of this application, numbers "first", "second", and the like are merely used to distinguish between different objects, for example, to distinguish between different parameter information or messages, and do not constitute a limitation on the scope of embodiments of this application. Embodiments of this application are not limited thereto.

It should be further understood that sequence numbers of the foregoing processes do not mean an execution sequence in embodiments of this application. The execution sequences of the processes should be determined based on functions and internal logic of the processes. Various numerical numbers or sequence numbers in the foregoing processes are merely distinguished for ease of description, and should not constitute any limitation on the implementation processes of embodiments of this application.

It should be further understood that the term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and another combination of A, B, and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory ROM, a random access memory RAM, a magnetic disk, or an optical disc.

What is claimed is:

1. An ephemeris information indication method, comprising:
- receiving, by a first communication apparatus, ephemeris information in a time window, wherein the ephemeris information corresponds to a system information modification period in which the time window is located;
- determining, by the first communication apparatus based on the system information modification period and a start position of the system information modification period, the system information modification period in which the time window is located; and
- determining, by the first communication apparatus, an ephemeris information reference time based on an end position of a 1$^{st}$ time window in the system information modification period in which the time window is located.

2. The method according to claim 1, wherein the system information modification period is the same as an ephemeris information update period, and the start position of the system information modification period is the same as a start position of the ephemeris information update period.

3. The method according to claim 1, further comprising:
- receiving, by the first communication apparatus, indication information that indicates that the ephemeris information update period is the same as the system information modification period, and the start position of the ephemeris information update period is the same as the start position of the system information modification period.

4. The method according to claim 1, wherein the system information modification period is greater than a periodicity of the time window.

5. The method according to claim 1, wherein a quantity of system frames comprised in the system information modification period is any one of 64, 128, 256, 512, and 1024.

6. The method according to claim 1, wherein the indication information is carried in a system information block 1 (SIB 1).

7. The method according to claim 1, wherein the time window is a system information time window.

8. A communication apparatus, comprising:
- at least one processor configured with processor-executable instructions to perform operations including:
- receiving ephemeris information in a time window, wherein the ephemeris information corresponds to a system information modification period in which the time window is located;
- determining, based on the system information modification period and a start position of the system information modification period, the system information modification period in which the time window is located; and
- determining an ephemeris information reference time based on an end position of a 1$^{st}$ time window in the system information modification period in which the time window is located.

9. The communication apparatus according to claim 8, wherein the system information modification period is the same as an ephemeris information update period, and the start position of the system information modification period is the same as a start position of the ephemeris information update period.

10. The communication apparatus according to claim 8, wherein the processor-executable instructions further cause the at least one processor to perform operations including:
- receiving indication information that indicates that the ephemeris information update period is the same as the system information modification period, and the start position of the ephemeris information update period is the same as the start position of the system information modification period.

11. The communication apparatus according to claim 8, wherein the system information modification period is greater than a periodicity of the time window.

12. The communication apparatus according to claim 8, wherein a quantity of system frames comprised in the system information modification period is any one of 64, 128, 256, 512, and 1024.

13. The communication apparatus according to claim 8, wherein the indication information is carried in a system information block 1 (SIB 1).

14. The communication apparatus according to claim 8, wherein the time window is a system information time window.

15. A non-transitory computer-readable storage medium storing computer instructions, that when executed by at least one processor, cause the at least one processor to perform operations comprising:
- receiving ephemeris information in a time window, wherein the ephemeris information corresponds to a system information modification period in which the time window is located;

determining, based on the system information modification period and a start position of the system information modification period in which the time window is located; and determining an ephemeris information reference time based on an end position of a $1^{st}$ time window in the system information modification period in which the time window is located.

16. The non-transitory computer-readable storage medium according to claim 15, wherein the system information modification period is the same as an ephemeris information update period, and the start position of the system information modification period is the same as a start position of the ephemeris information update period.

17. The non-transitory computer-readable storage medium according to claim 15, wherein the computer instructions, when executed by the at least one processor, further cause the at least one processor to perform operations including:

receiving indication information that indicates that the ephemeris information update period is the same as the system information modification period, and the start position of the ephemeris information update period is the same as the start position of the system information modification period.

18. The non-transitory computer-readable storage medium according to claim 15, wherein the system information modification period is greater than a periodicity of the time window.

19. The non-transitory computer-readable storage medium according to claim 15, wherein a quantity of system frames comprised in the system information modification period is any one of 64, 128, 256, 512, and 1024.

20. The non-transitory computer-readable storage medium according to claim 15, wherein the indication information is carried in a system information block 1 (SIB 1).

* * * * *